United States Patent
Stakoe et al.

(10) Patent No.: US 10,421,408 B2
(45) Date of Patent: Sep. 24, 2019

(54) SUN VISOR FITTING WITH INTEGRATED SUNGLASS CLIP

(71) Applicant: FORD GLOBAL TECHNOLOGIES, LLC, Dearborn, MI (US)

(72) Inventors: John Andrew Stakoe, Bloomfield Hills, MI (US); Ahmad Miqdadi, Ann Arbor, MI (US); Ryan Kurrle, Royal Oak, MI (US); Daniel Ryan Bechlem, Garden City, MI (US); Michael Murphy McElroy, South Lyon, MI (US); Andrew Dayton Phillips, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/720,677

(22) Filed: Sep. 29, 2017

(65) Prior Publication Data
US 2019/0100149 A1  Apr. 4, 2019

(51) Int. Cl.
| B60R 7/05 | (2006.01) |
| B60R 7/08 | (2006.01) |
| F16B 2/20 | (2006.01) |
| B60J 3/02 | (2006.01) |

(52) U.S. Cl.
CPC .............. B60R 7/05 (2013.01); B60R 7/082 (2013.01); F16B 2/20 (2013.01); *B60J 3/0204* (2013.01)

(58) Field of Classification Search
CPC ........ B60R 7/082; B60R 7/05; Y10S 248/902
See application file for complete search history.

(56) References Cited

U.S. PATENT DOCUMENTS

| 3,016,262 | A |   | 1/1962  | Hunt |
| 4,157,166 | A | * | 6/1979  | Voelker ................. A45C 11/04 224/250 |
| 4,450,989 | A | * | 5/1984  | Bogar, Jr. ............ A47B 81/005 211/64 |
| 4,576,320 | A | * | 3/1986  | Mead ..................... B60R 7/082 224/311 |
| 4,695,026 | A | * | 9/1987  | Medley, Jr. ............ A47G 29/08 211/89.01 |
| 4,715,575 | A |   | 12/1987 | Kamerer |
| 5,074,508 | A | * | 12/1991 | Powers ..................... B60R 7/10 211/31 |
| 5,082,225 | A |   | 1/1992  | Nespoli |
| 5,538,311 | A | * | 7/1996  | Fusco ...................... B60R 7/05 224/312 |

(Continued)

FOREIGN PATENT DOCUMENTS

| JP | 2003267049 A | 9/2003 |
| JP | 2004354902 A | 12/2004 |
| JP | 2010173627 A | 8/2010 |

OTHER PUBLICATIONS

English Machine Translation of JP2003267049A.
English Machine Translation of JP2004354902A.
English Machine Translation of JP2010173627A.

*Primary Examiner* — Justin M Larson
(74) *Attorney, Agent, or Firm* — Vichit Chea; King & Schickli, PLLC

(57) ABSTRACT

A sun visor fitting for holding sunglasses or other objects in a readily accessible position along the face of sun visor includes a body having a mounting section, a visor pin, a first clip and a second clip projecting from the first clip.

7 Claims, 9 Drawing Sheets

(56) References Cited

U.S. PATENT DOCUMENTS

| | | | | |
|---|---|---|---|---|
| 5,573,217 | A | | 11/1996 | Garvey et al. |
| 5,619,774 | A | | 4/1997 | Perry |
| 5,794,312 | A | * | 8/1998 | O'Mahony ............... A45F 5/02 24/3.3 |
| 5,860,191 | A | * | 1/1999 | Sieger ....................... A45F 5/02 24/13 |
| 5,966,783 | A | * | 10/1999 | Genereux ............... A47F 7/021 24/557 |
| 6,062,627 | A | * | 5/2000 | Murdock ............... B60J 3/0213 296/97.1 |
| 6,120,086 | A | * | 9/2000 | Miller ................... B60J 3/0278 296/97.1 |
| 6,134,753 | A | | 10/2000 | O'Mahony |
| 7,543,880 | B2 | * | 6/2009 | Wieczorek ............... B60J 3/023 224/312 |
| 8,960,762 | B2 | * | 2/2015 | Huelke .................... B60J 3/023 296/97.5 |
| 9,073,494 | B1 | | 7/2015 | Clark et al. |
| 9,278,608 | B2 | * | 3/2016 | Mingay ................. B60J 3/0217 |
| 2011/0070018 | A1 | | 3/2011 | Nedelman et al. |

\* cited by examiner

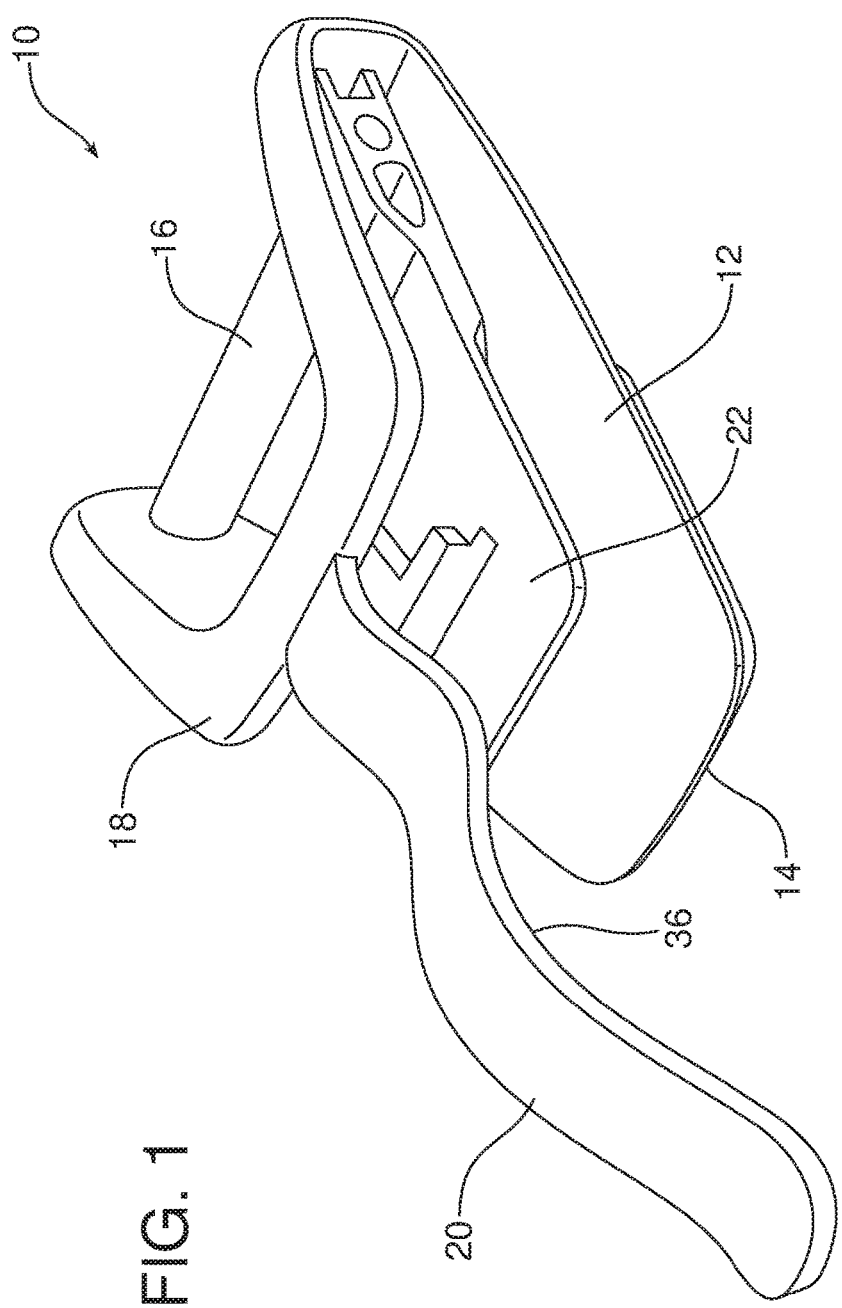

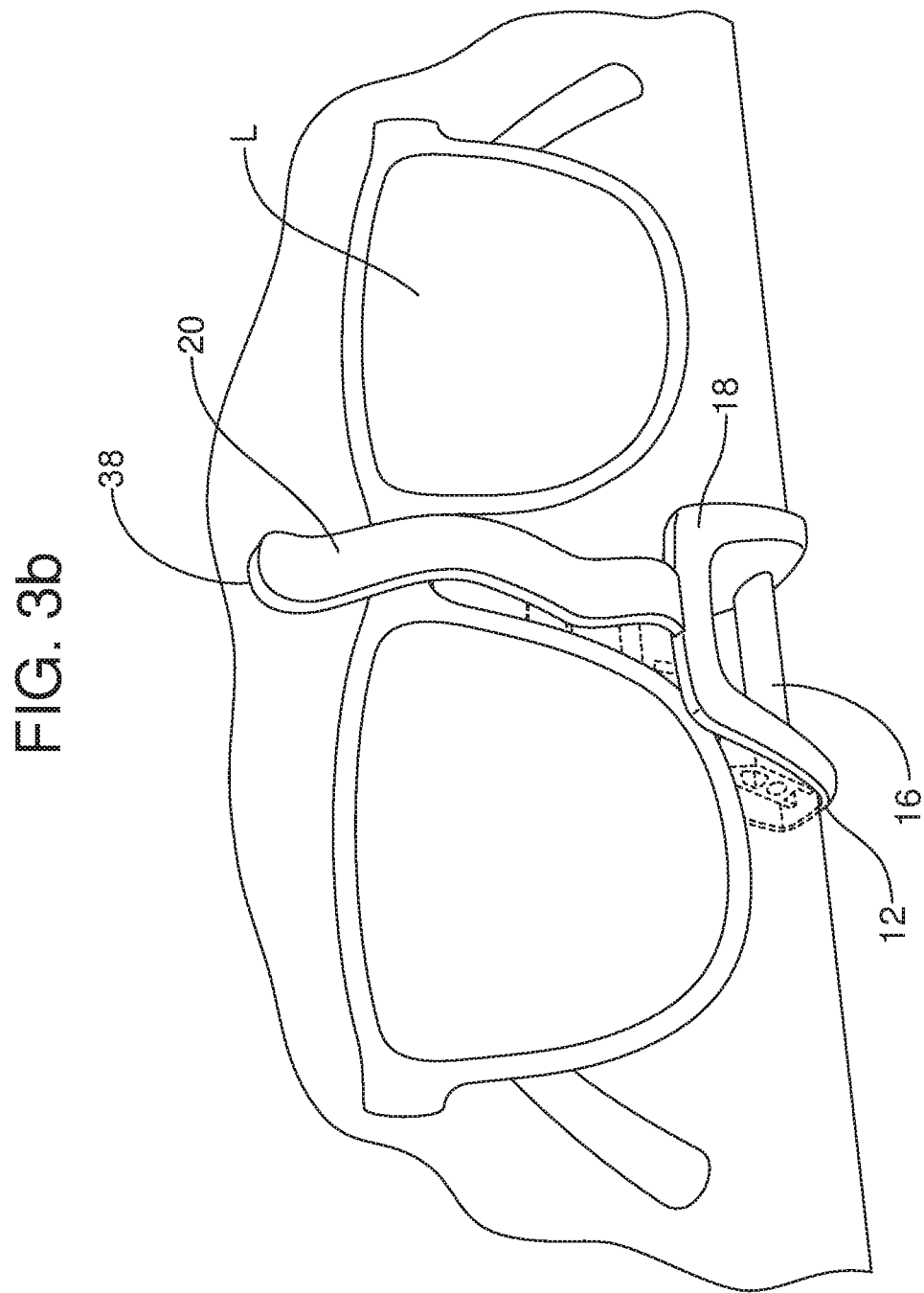

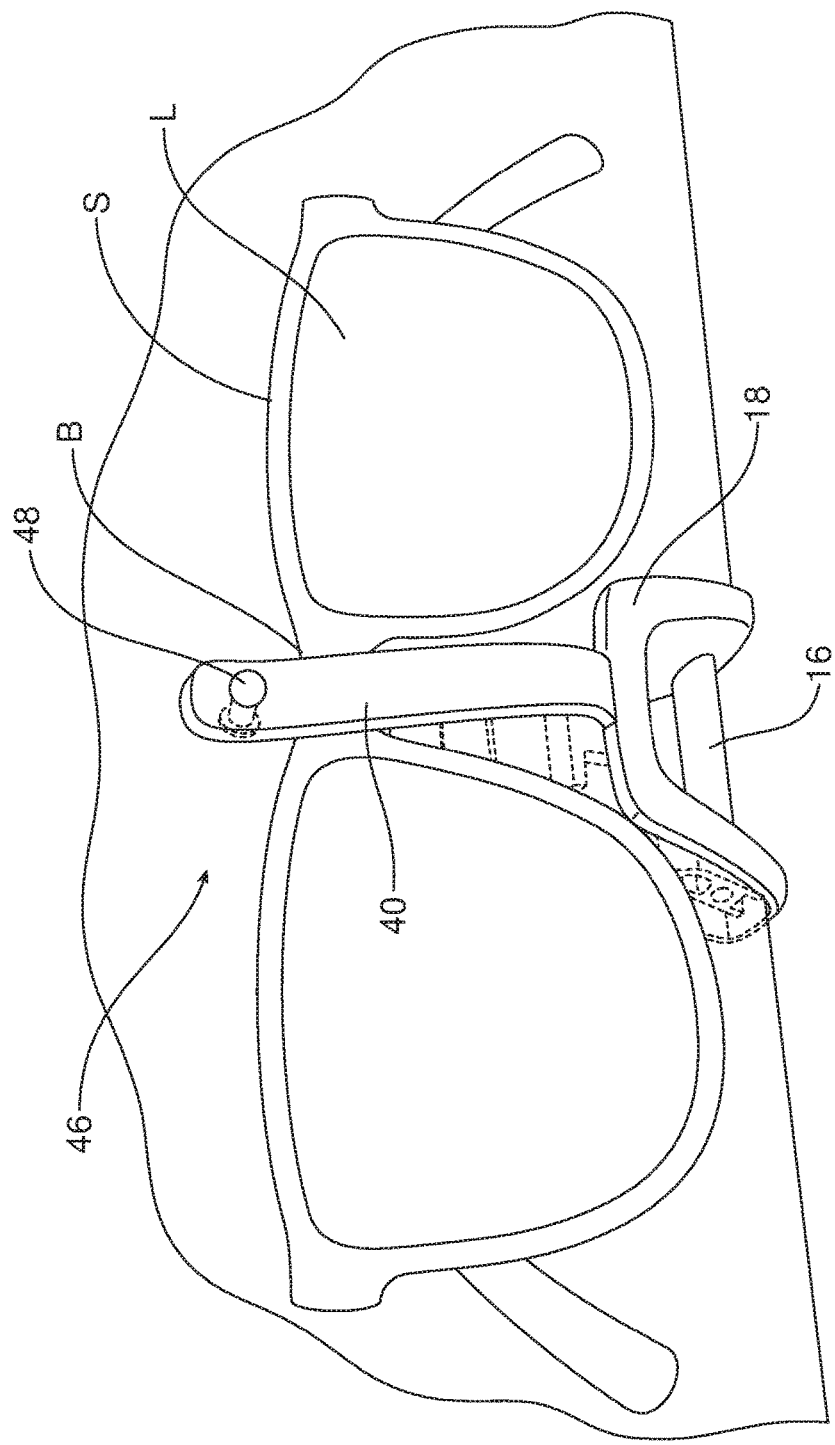

SUN VISOR FITTING WITH INTEGRATED SUNGLASS CLIP

TECHNICAL FIELD

This document relates generally to the motor vehicle equipment field and, more particularly, to a sun visor fitting incorporating an integrated clip that may be utilized to hold a pair of sunglasses or other objects where they may be easily accessed for use.

BACKGROUND

It is known in the art to stow sunglasses in a dedicated sunglass bin that protects the lenses of the sunglasses from being scratched. Such a bin is commonly located in an overhead console assembly. U.S. Pat. No. 9,073,494, assigned to Ford Global Technologies, LLC, discloses such a sunglass bin.

Soft top convertibles do not allow for overhead consoles with sunglass bins. Further, current package constraints, due to added content in future vehicles, are eliminating the ability to locate sunglass bins in the instrument panel. Additionally, due to heavy market competition, automobile manufacturers have found it necessary to develop storage locations for sunglasses that are common across all variants of a particular motor vehicle model range.

This document relates to a sun visor fitting incorporating an integral clip having one or more fingers to hold sunglasses at a conveniently accessed location along the face of the sun visor. Advantageously, the sun visor fitting is relatively inexpensive to produce and effectively holds the sunglasses in a desired storage position even when subjected to the acceleration, deceleration and lateral forces experienced during motor vehicle operation while protecting the lenses from scratches. Further, the sun visor fitting may be used across a wide range of motor vehicles.

SUMMARY

In accordance with the purposes and benefits described herein, a new and improved sun visor fitting is provided for holding sunglasses and other items at a conveniently accessed location along the face of a sun visor. The sun visor fitting comprises a body including a mounting section, a visor pin, a first clip and a second clip projecting from the first clip. The body may be an integrated one-piece construction. In one possible embodiment, the second clip comprises a resilient finger. In one or more embodiments of the sun visor fitting, the resilient finger may include a wavy profile.

The resilient finger may comprise a two-shot construction. Thus, the resilient finger may have an inner layer molded from a first material and an outer layer molded from a second material. That first material may be selected from a first group of materials consisting of a structural plastic, a structural composite material and combinations thereof. That second material may be selected from a group of materials consisting of an elastomeric material, a rubber material and combinations thereof.

In some embodiments, the mounting section, the pin and the first clip may also be made from the first material. In some embodiments the resilient finger may further include a wire core. That wire may be made from a third material selected from a third group of materials consisting of aluminium or metal sheet stock.

In one particularly useful embodiment the first material is selected from a first group of materials consisting of acrylonitrile butadiene styrene (ABS), polycarbonate/acrylonitrile butadiene styrene (PC/ABS) and combinations thereof. The second material is selected from a second group of materials consisting of thermoplastic elastomer (TPE), thermoplastic polyolefin (TPO), thermoplastic vulcanisate (TPV) and combinations thereof. For certain applications the resilient finger of such an embodiment may also include a wire core. That wire core may be made from a third material selected from a third group of materials consisting of aluminium or metal sheet stock.

In yet another possible embodiment, the second clip comprises a tether strap and the sun visor fitting further includes a tether. Such an embodiment may also include a fastening feature releasably securing a distal end of the tether strap to the tether. That fastening feature may comprise a snap tab on the visor body and a snap tab receiver on the distal end of the tether strap.

In one or more embodiments of the sun visor fitting, the visor pin may span the first clip. Further, in one or more embodiments the sun visor fitting may include a second clip comprising multiple resilient fingers.

In the following description, there are shown and described several preferred embodiments of the sun visor fitting. As it should be realized, the sun visor fitting is capable of other, different embodiments and its several details are capable of modification in various, obvious aspects all without departing from the sun visor fitting as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor fitting and together with the description serve to explain certain principles thereof.

FIG. 1 is a detailed perspective view of a first embodiment of the sun visor fitting including a resilient finger.

FIGS. 3a and 3b illustrate how the sun visor fitting and, more particularly, the resilient finger of the sun visor fitting may be utilized to receive and hold a pair of sunglasses.

FIGS. 4a and 4b are elevational views illustrating an alternative embodiment of sun visor fitting including a tether strap for holding a pair of sunglasses.

Reference will now be made in detail to the present preferred embodiments of the sun visor fitting, examples of which are illustrated in the accompanying drawing figures.

DETAILED DESCRIPTION

Figure 2A:
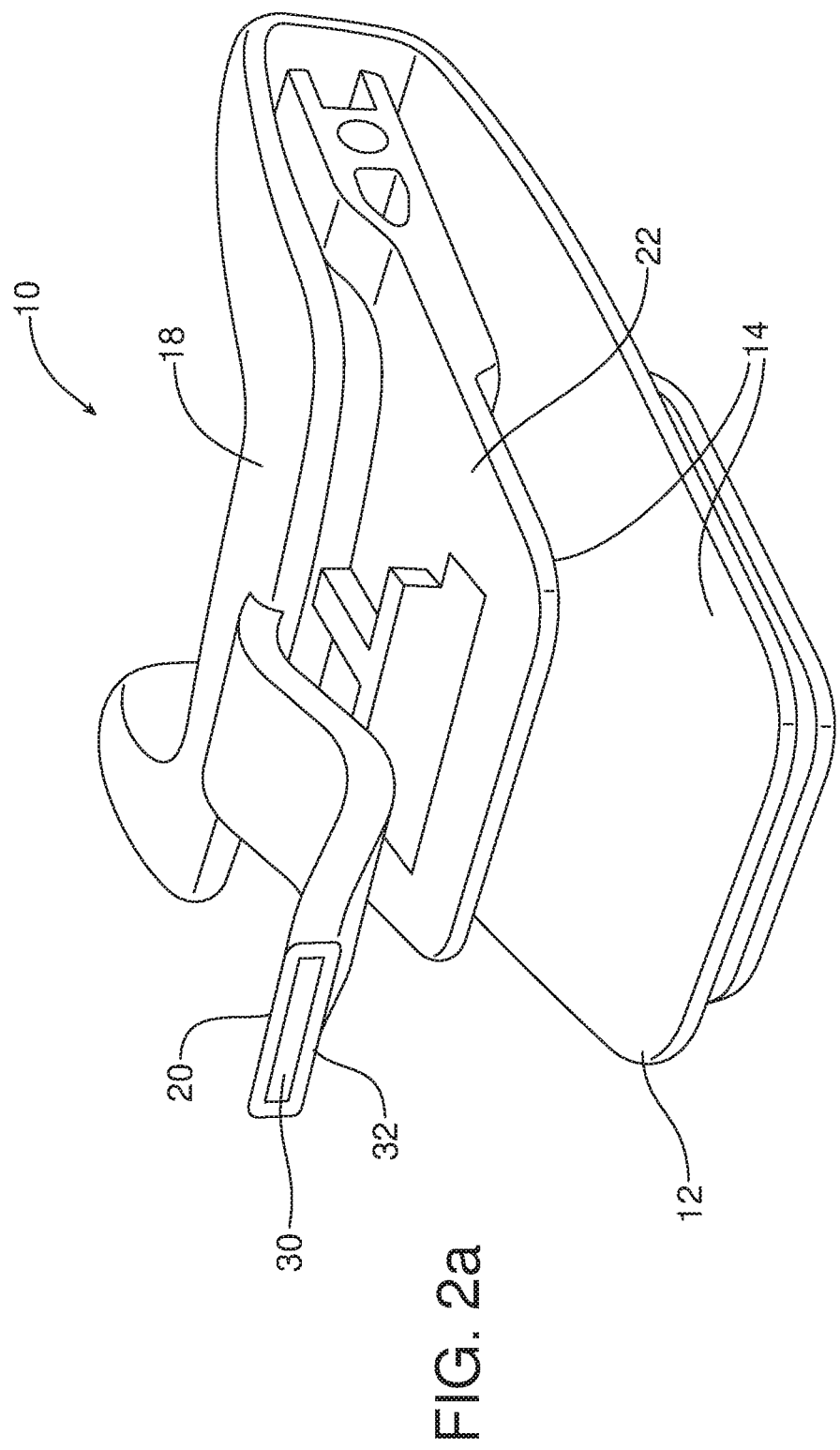
FIG. 2a is a view similar to FIG. 1 but illustrating the two-shot construction of the resilient finger projecting from the first clip of the sun visor fitting.
Figure 3A:
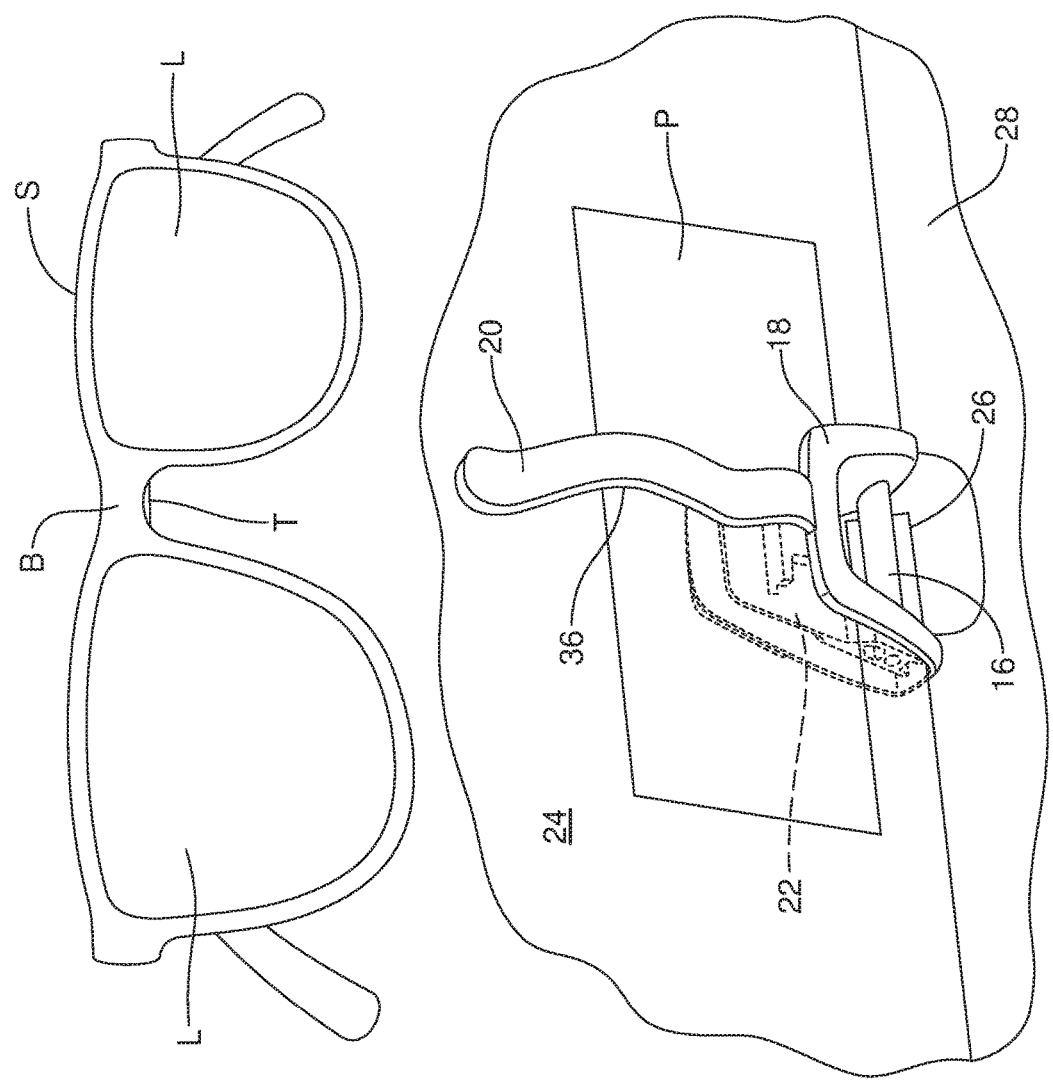

Reference is now made to FIGS. 1 and 2a illustrating a first embodiment of sun visor fitting 10. The sun visor fitting 10 includes a body 12 having a mounting section 14, a visor pin 16, a first clip 18 and a second clip, in the form of a resilient finger 20, projecting from the first clip. The sun visor fitting 10 may be fully integrated and have a one-piece construction. Further, the sun visor fitting 10 may be made from a two-shot molding process. As illustrated, the mounting section 14 includes a mounting lug 22 adapted to engage in the visor body 24 (see FIGS. 3a, 3b). The visor pin 16 spans the clip 18. As illustrated in FIG. 3a, the visor pin 16 engages in the bracket 26 at the headliner 28 to hold the distal end of the visor body 24 in a position at the top of the windshield. The visor pin 16 may be removed from the bracket 26 to pivot the distal end of the visor body 24 toward the side window of the motor vehicle in a manner known in the art.

As illustrated in FIG. 2a, the resilient finger 20 has an inner layer 30 molded from a first material and an outer layer 32 molded from a second material. The first material may be selected from a first group of materials consisting of a structural plastic, a structural composite material and combinations thereof. The second material may be selected from a second group of materials consisting of an elastomeric material, a rubber material and combinations thereof. The mounting section 14, the visor pin 16 and the clip 18 may also be made from the first material.

Thus, it should be appreciated that the integrated sun visor fitting 10 may be made in a two-shot molding process wherein the mounting section 14, the visor pin 16, the clip 18 and the inner layer 30 of the resilient finger 20 are all molded from the first material in the first shot of the molding process and then the outer layer 32 of the resilient finger is molded from the second material in the second shot of the process. The first material would have a higher melting point and softening point than the second material used in this process.

In one of many possible embodiments, the first material for the inner layer 30, the mounting section 14, the visor pin 16 and the clip 18 may be selected from a first group of materials consisting of acrylonitrile butadiene styrene (ABS), polycarbonate/acrylonitrile butadiene styrene (PC/ABS) and combinations thereof. The second material used for the outer layer 32 of the resilient finger 20 may be made from a second group of materials consisting of thermoplastic elastomer (TPE), thermoplastic polyolefin (TPO), thermoplastic vulcanisate (TPV) and combinations thereof.

Figure 2B:
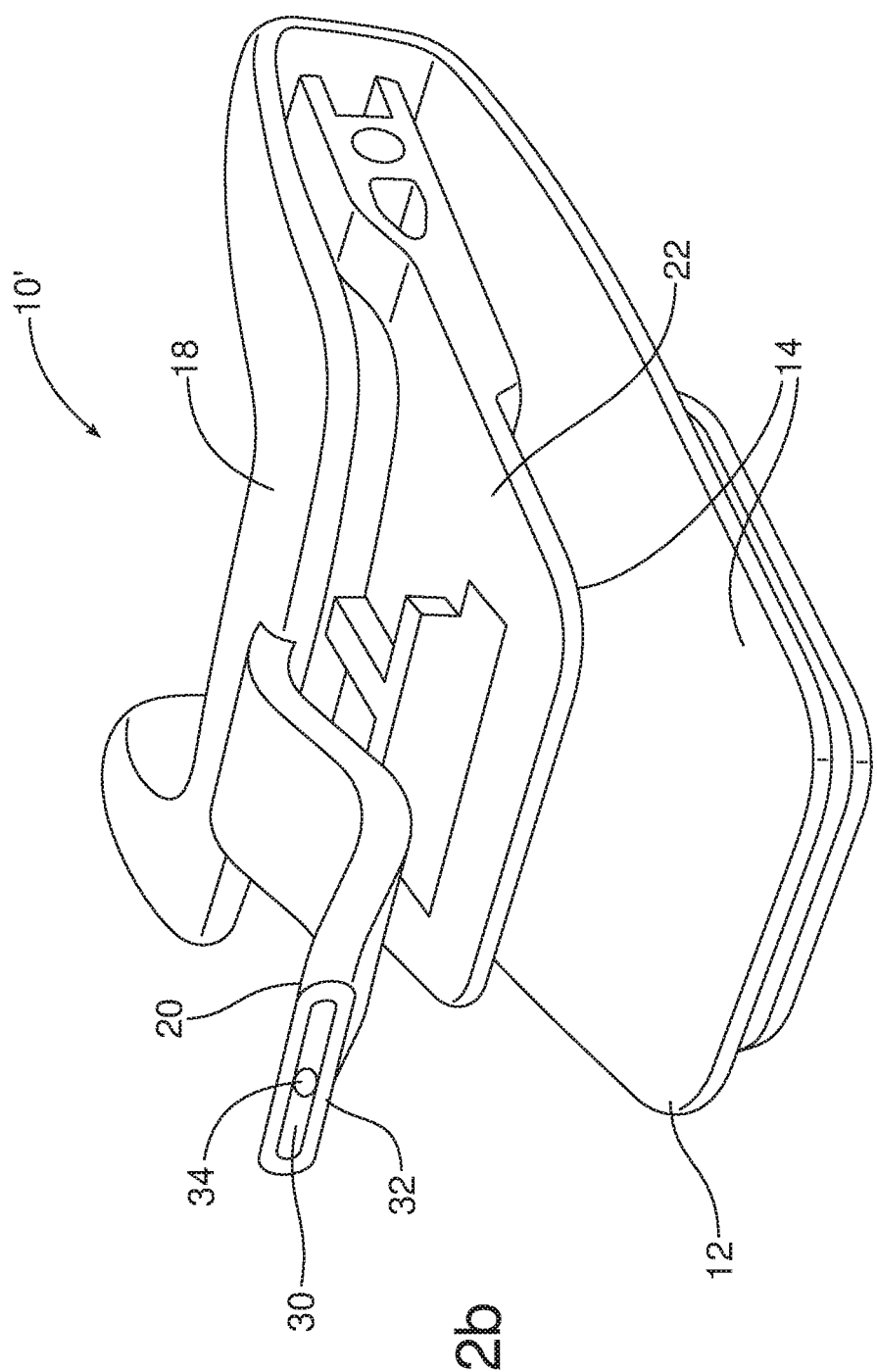
FIG. 2b is a view similar to FIG. 2a but illustrating an alternative embodiment wherein the resilient finger further includes a wire core.

As illustrated in FIG. 2b, an alternative of sun visor fitting 10' may further include a wire core 34 running from the clip 18 through the resilient finger 20. That wire core 34 may be made from a third material selected from a third group of materials consisting of aluminium or metal sheet stock. The resilient metal used in the wire core 34 will help strengthen the resilient finger 20 and provide enhanced gripping force for certain applications.

As illustrated in FIG. 1, the resilient finger 20 may include a wavy, S-curved or bell shaped profile defining a U-shaped gripping surface 36. As illustrated in FIGS. 3a and 3b, that U-shaped gripping surface 36 opens toward the visor body 24.

FIG. 3a illustrates the sun visor fitting 10 connected by the mounting section 14 to the visor body 24 with the visor pin 16 secured in the bracket 26 at the headliner 28. A piece of note paper P is held between the clip 18 and the visor body 24 where it may be easily accessed when desired. The resilient finger 20 rests in its normal or home position against the visor body 24. Sunglasses S are positioned to be inserted under the resilient finger 20 and retained in position against the visor body 24 by the resilient finger of the sun visor fitting 10.

As illustrated in FIG. 3b, the sunglasses S are shifted in the direction of action arrow A so that the bridge B of the sunglasses is pushed past the distal end 38 of the resilient finger 20 and received between the U-shaped gripping surface 36 of the resilient finger and the visor body 24. Advantageously, the resilience of the material from which the resilient finger 20 is made causes the bridge B of the sunglasses S to be firmly gripped between the gripping surface 36 of the resilient finger 20 and the visor body 24 thereby holding the sunglasses in position even when subjected to acceleration, deceleration and lateral cornering forces experienced during operation of the motor vehicle. Here it should be noted that the lenses L of the sunglasses S are held in a manner that prevents any scratching.

Figure 4A:
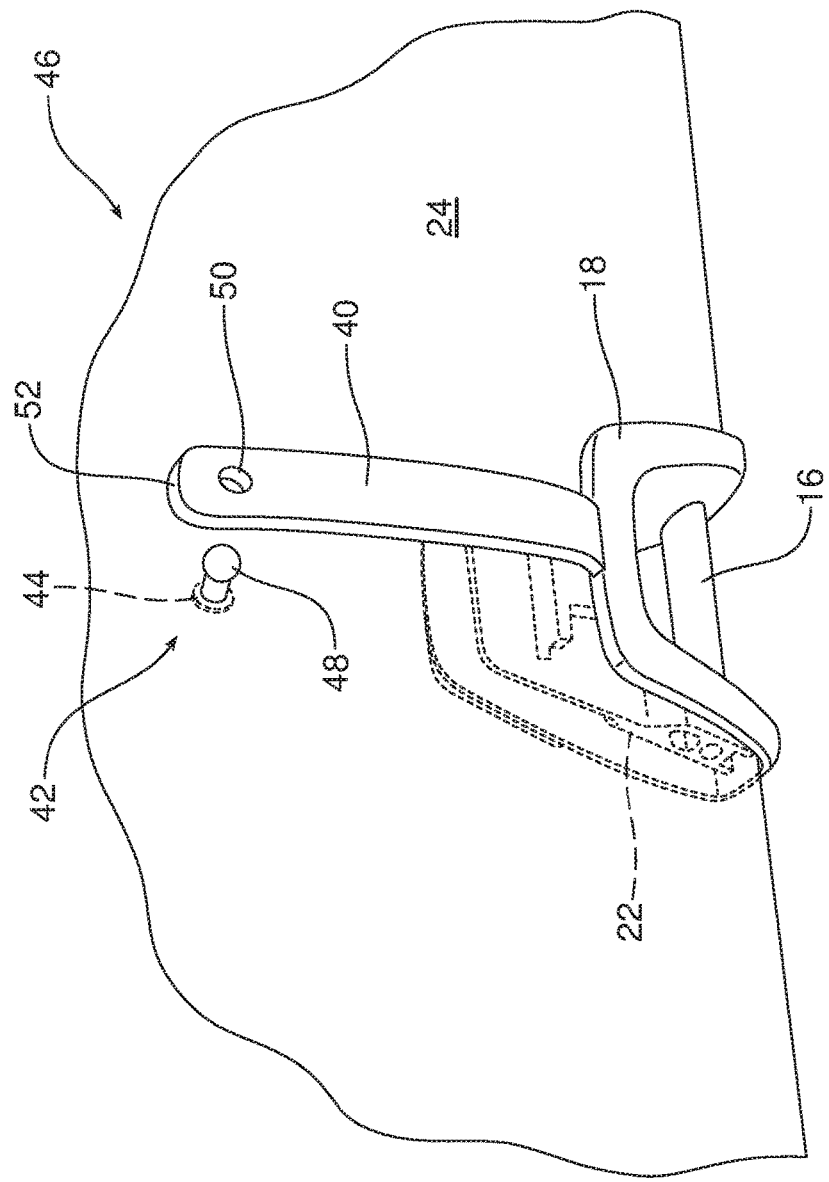
Figure 4C:
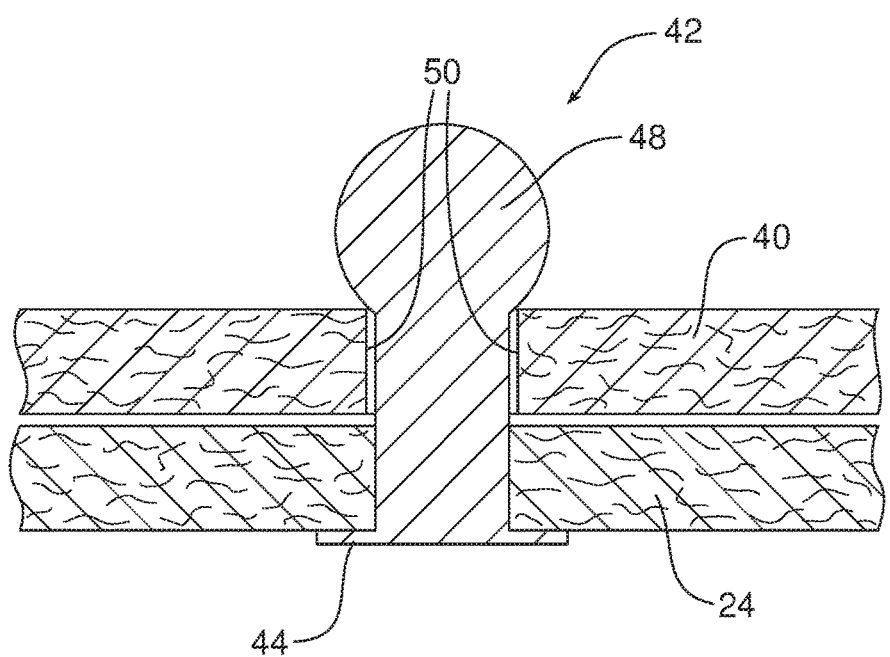
FIG. 4c is a detailed schematic view of the tether strap engaged with the snap tab fastening feature.

Reference is now made to FIGS. 4a and 4b illustrating yet another alternative embodiment of the sun visor fitting 10. The sun visor fitting 10 illustrated in FIGS. 4a and 4b includes a body 12 having a mounting section 14, a visor pin 16 and a clip 18 just like the embodiment illustrated in FIGS. 1, 2a, 3a and 3b. In this embodiment, the resilient finger 20 is replaced by a tether strap 40. The sun visor fitting 10 also includes a tether 42. Tether 42 has a base 44 secured to the visor body 24. A fastening feature, generally designated by reference numeral 46 releasably secures the tether strap 40 to the tether 42. In the illustrated embodiment, the fastening feature 46 comprises a snap tab 48 carried on the base 44 of the tether 42 and a snap tab receiver 50 in the form of an aperture on the distal end 52 of the tether strap 40. As illustrated in FIGS. 4a and 4b, one secures the sunglasses S to the sun visor fitting 10 by (a) positioning the sunglasses adjacent the sun visor fitting, (b) wrapping the tether strap 40 around the bridge B and temples T of the sunglasses and (c) pushing the snap tab 48 through the snap tab receiver 50.

Figure 5:
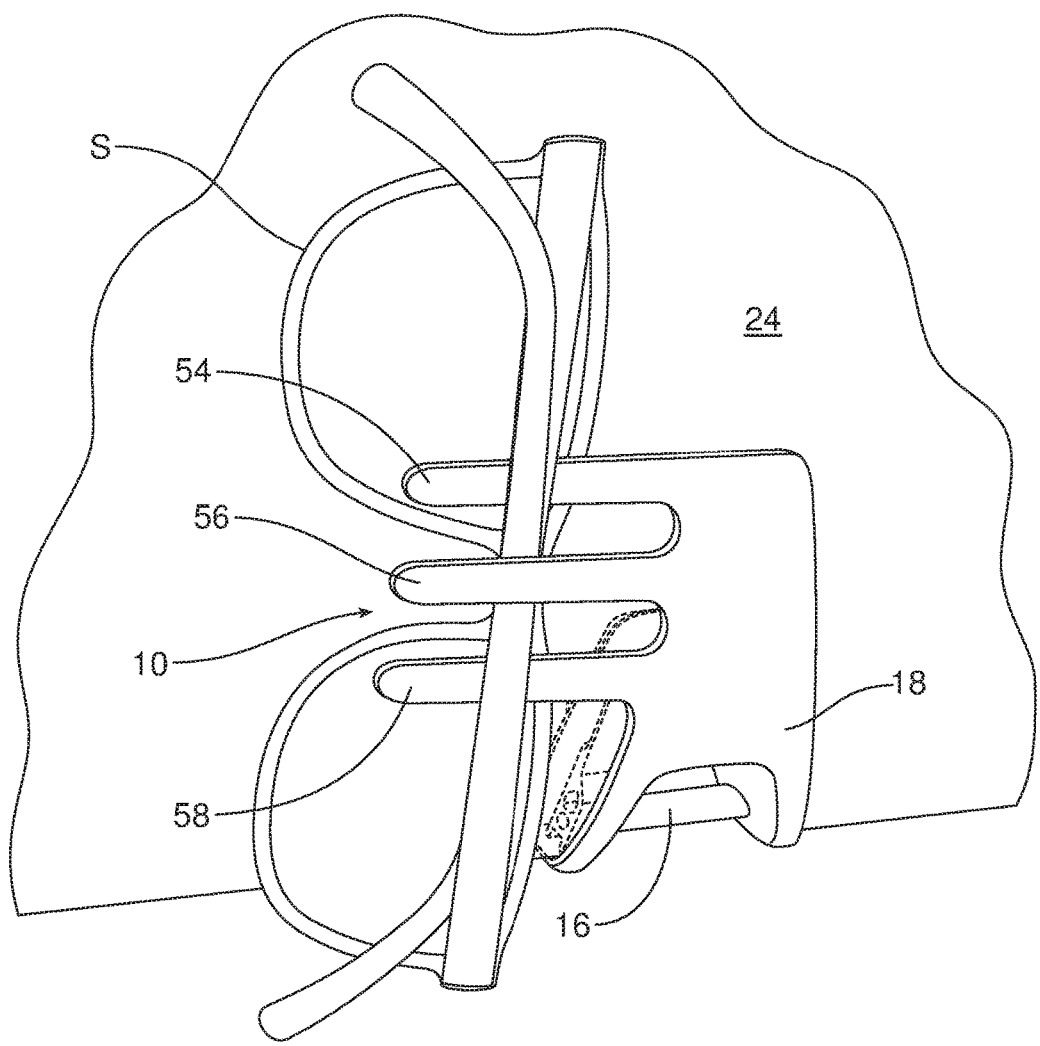
FIG. 5 illustrates yet another possible embodiment of sun visor fitting incorporating multiple resilient fingers.

The foregoing has been presented for purposes of illustration and description. It is not intended to be exhaustive or to limit the embodiments to the precise form disclosed. Obvious modifications and variations are possible in light of the above teachings. For example, as illustrated in FIG. 5, the sun visor fitting 10 may include multiple resilient fingers 54, 56, 58 adapted to hold sunglasses S or other objects in a readily accessible position along a face of a visor body 24. All such modifications and variations are within the scope of the appended claims when interpreted in accordance with the breadth to which they are fairly, legally and equitably entitled.

What is claimed:

1. A sun visor fitting, comprising:
   a body including a mounting section, a visor pin, a first clip and a second clip projecting from said first clip wherein said second clip is a tether strap; and
   a tether.

2. The sun visor fitting of claim 1 wherein said body is one piece.

3. The sun visor fitting of claim 1, wherein said mounting section, said visor pin and said first clip are made from said first material.

4. The sun visor fitting of claim 3 wherein said first material is selected from a first group of materials consisting of acrylonitrile butadiene styrene (ABS), polycarbonate/acrylonitrile butadiene styrene (PC/ABS) and combinations thereof.

5. The sun visor fitting of claim 1, further including a fastening feature releasably securing a distal end of said tether strap to said tether.

6. The sun visor fitting of claim 5, wherein said fastening feature comprises a snap tab on said tether and a snap tab receiver on said distal end of said tether strap.

7. The sun visor fitting of claim 1, wherein said visor pin spans said first clip.

* * * * *